(12) United States Patent
Lehtiniemi et al.

(10) Patent No.: US 12,342,120 B2
(45) Date of Patent: Jun. 24, 2025

(54) CONTROL OF AN EARPHONE DEVICE

(71) Applicant: NOKIA TECHNOLOGIES OY, Espoo (FI)

(72) Inventors: Arto Juhani Lehtiniemi, Lempäälä (FI); Jussi Artturi Leppänen, Tampere (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/428,933

(22) Filed: Jan. 31, 2024

(65) Prior Publication Data
US 2024/0171893 A1 May 23, 2024

Related U.S. Application Data

(63) Continuation of application No. 17/588,813, filed on Jan. 31, 2022, now Pat. No. 11,950,041.

(30) Foreign Application Priority Data

Feb. 17, 2021 (EP) ................................. 21157511

(51) Int. Cl.
*A61F 2/20* (2006.01)
*G06F 3/041* (2006.01)
*H04R 1/10* (2006.01)

(52) U.S. Cl.
CPC ........... *H04R 1/1041* (2013.01); *G06F 3/041* (2013.01)

(58) Field of Classification Search
CPC ............................. H04R 1/1041; G06F 3/041
See application file for complete search history.

(56) References Cited

U.S. PATENT DOCUMENTS

| | | | |
|---|---|---|---|
| 8,983,083 B2 | 3/2015 | Tiscareno et al. | |
| 9,516,442 B1 | 12/2016 | Dusan et al. | |
| 9,648,410 B1 | 5/2017 | Kratsas et al. | |
| 2007/0274530 A1* | 11/2007 | Buil | H04R 1/1041 381/74 |
| 2009/0226013 A1 | 9/2009 | Burge | |
| 2014/0016803 A1 | 1/2014 | Puskarich | |
| 2018/0152795 A1 | 5/2018 | Lee et al. | |
| 2019/0098390 A1* | 3/2019 | Carino | H04R 5/033 |
| 2021/0014603 A1 | 1/2021 | Wei | |

(Continued)

FOREIGN PATENT DOCUMENTS

EP    3499910 A1    6/2019

OTHER PUBLICATIONS

"IEEE 802.11", Wikipedia, Retrieved on Jan. 31, 2022, Webpage available at : https://en.wikipedia.org/wiki/IEEE_802.11.

(Continued)

*Primary Examiner* — Simon King
(74) *Attorney, Agent, or Firm* — ALSTON & BIRD LLP

(57) ABSTRACT

An apparatus, method and computer program for controlling an earphone device is disclosed. The apparatus may comprise means for detecting a condition corresponding to an earphone device becoming disengaged from a user's ear and for operating said earphone device in an adjustment mode based on detecting the condition, wherein, in the adjustment mode, an operation associated with a touch sensor on said earphone device is changed.

21 Claims, 5 Drawing Sheets

(56) References Cited

U.S. PATENT DOCUMENTS

| | | | |
|---|---|---|---|
| 2021/0014613 A1* | 1/2021 | Carrigan | H04R 3/12 |
| 2021/0144478 A1* | 5/2021 | DeCastro | G06F 3/167 |
| 2021/0409855 A1* | 12/2021 | Bell-Booth | H04R 1/1016 |
| 2022/0087551 A1* | 3/2022 | Montgomery, II | G06F 3/03547 |

OTHER PUBLICATIONS

Extended European Search Report for corresponding European Patent Application No. 21157511.3 dated Nov. 30, 2021, 13 pages.
Non-Final Office Action for U.S. Appl. No. 17/588,813 dated Aug. 3, 2023.
Notice of Allowance for U.S. Appl. No. 17/588,813 dated Dec. 1, 2023.
Office Action for European Application No. 21157511.3 dated Apr. 23, 2024, 5 pages.
Partial European Search Report for corresponding European Patent Application No. 21157511.3 dated Aug. 26, 2021, 12 pages.
Office Action for Chinese Application No. 202210141167.4 dated Jan. 8, 2025, 13 pages.

* cited by examiner

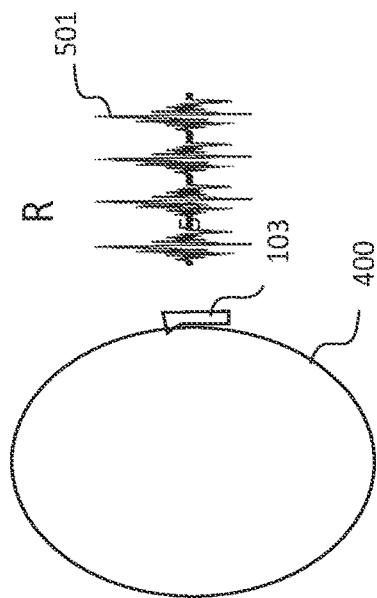
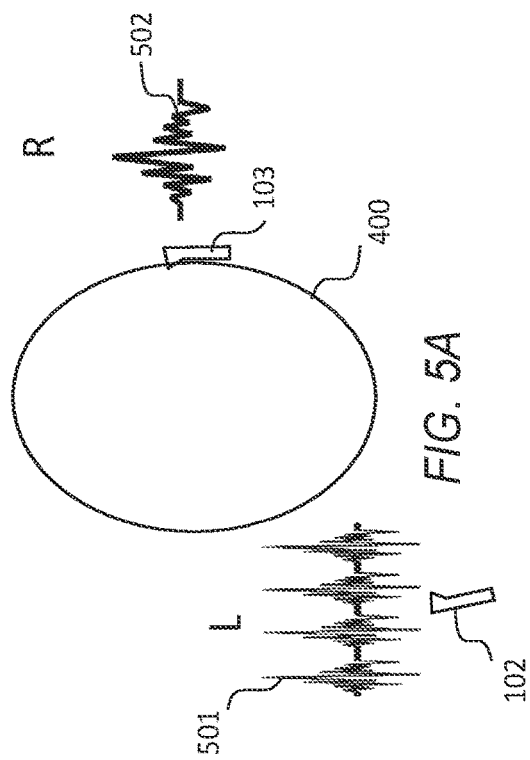

CONTROL OF AN EARPHONE DEVICE

CROSS-REFERENCE TO RELATED APPLICATIONS

This application is a continuation of U.S. application Ser. No. 17/588,813, filed Jan. 31, 2022, which claims priority to European Patent Application No. 21157511.3, filed Feb. 17, 2021, the entire contents of which are incorporated herein by reference.

FIELD

Example embodiments relate to an apparatus, method and computer program for control of an earphone device.

BACKGROUND

Earphone devices, a term which may encompass devices which are placed on, over or partly within ears (e.g. earphones or earbuds) are devices configured to output audio signals or audio data as sound waves via one or more output transducers, e.g. loudspeakers, to an ear of a user. A pair of earphone devices may be provided as a set, each earphone for placement over or within a respective ear of the user, i.e. left and right ears, and therefore which may be used to output stereoscopic or even spatial audio to the user. Earphone devices may also comprise an input transducer, e.g. a microphone, active noise reduction (ANR) functionality and/or one or more touch sensors on a body of one or both earphones.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for detecting a condition corresponding to an earphone device becoming disengaged from a user's ear; and operating said earphone device in an adjustment mode based on detecting the condition, wherein, in the adjustment mode, an operation associated with a touch sensor on said earphone device is changed.

In the adjustment mode, the apparatus may be configured to disable operation of the touch sensor.

The apparatus may further comprise means for determining a user's hand being in proximity of said earphone device, and wherein the apparatus may be configured to operate said earphone device in the adjustment mode based on detecting the condition and the user's hand being in proximity of said earphone device.

In the adjustment mode, the apparatus may be further configured to reduce a volume of, or disable output of, an audio signal being output from said earphone device.

In the adjustment mode, the apparatus may be configured to disable output of the audio signal and to move output of the audio signal to a second earphone device having a paired relationship with said earphone device.

In the adjustment mode, the apparatus may be configured to determine a similarity between a first audio signal being output from said earphone device and a second audio signal being output from the second earphone device, and to move output of the first audio signal to the second earphone device only if the similarity is below a predetermined threshold value.

In the adjustment mode, the apparatus may be further configured to disable operation of a microphone provided on said earphone device.

The apparatus may be further configured to enable operation of a microphone provided on a second earphone device having a paired relationship with said earphone device.

The apparatus may further comprise means for detecting a subsequent condition corresponding to said earphone device becoming re-engaged with the user's ear, wherein the apparatus is configured to cancel the adjustment mode based on the detected re-engaged condition.

The apparatus may be configured to cancel the adjustment mode based on the re-engaged condition and the user's hand not being proximate to said earphone device.

The apparatus may further comprise means for issuing a notification via a user interface, the notification being associated with operating said earphone device in the adjustment mode.

The notification may comprise an audio notification by an output transducer of said earphone device.

The apparatus may further comprise means for: detecting a condition corresponding to the earphone device, being a first earphone device, and a second earphone device having a paired relationship with the first earphone device, becoming disengaged from a user's ear at a same time; based on detecting the condition: operating the first earphone device in the adjustment mode; detecting a subsequent condition corresponding to the first earphone device becoming re-engaged with the user's ear; cancelling the adjustment mode for the first earphone device based on the detected re-engaged condition; and operating the second earphone device in the adjustment mode based on the adjustment mode for the first earphone device being cancelled.

The apparatus may further comprising means for detecting a condition corresponding to the earphone device becoming completely disengaged from the user's ear; prior to operating said earphone device in an adjustment mode, causing output of an alert sound by an audio transducer of said earphone device; receiving an input corresponding to the user locating the earphone device; and operating the earphone device in the adjustment mode responsive to the received input.

The apparatus may further comprise means for determining that the earphone device is beyond a predetermined distance from the user's ear and, responsive thereto, the apparatus may be configured to cause output of an alert sound to another, second earphone device having a paired relationship with said earphone device.

According to a second aspect, this specification describes a method, comprising: detecting a condition corresponding to an earphone device becoming disengaged from a user's ear; and operating said earphone device in an adjustment mode based on detecting the condition, wherein, in the adjustment mode, an operation associated with a touch sensor on said earphone device is changed.

In the adjustment mode, the method may comprise disabling operation of the touch sensor.

The method may further comprise determining a user's hand being in proximity of said earphone device, and operating said earphone device in the adjustment mode based on detecting the condition and the user's hand being in proximity of said earphone device.

In the adjustment mode, the method may further comprise reducing a volume of, or disabling output of, an audio signal being output from said earphone device.

In the adjustment mode, the method may disable output of the audio signal and move output of the audio signal to a second earphone device having a paired relationship with said earphone device.

In the adjustment mode, the method may determine a similarity between a first audio signal being output from said earphone device and a second audio signal being output from the second earphone device, and move output of the first audio signal to the second earphone device only if the similarity is below a predetermined threshold value.

In the adjustment mode, the method may further comprise disabling operation of a microphone provided on said earphone device.

The method may further comprise enabling operation of a microphone provided on a second earphone device having a paired relationship with said earphone device.

The method may further comprise detecting a subsequent condition corresponding to said earphone device becoming re-engaged with the user's ear, and cancelling the adjustment mode based on the detected re-engaged condition.

The method may comprise cancelling the adjustment mode based on the re-engaged condition and the user's hand not being proximate to said earphone device.

The method may comprise issuing a notification via a user interface, the notification being associated with operating said earphone device in the adjustment mode.

The notification may comprise an audio notification by an output transducer of said earphone device.

The method may further comprise: detecting a condition corresponding to the earphone device, being a first earphone device, and a second earphone device having a paired relationship with the first earphone device, becoming disengaged from a user's ear at a same time; based on detecting the condition: operating the first earphone device in the adjustment mode; detecting a subsequent condition corresponding to the first earphone device becoming re-engaged with the user's ear; cancelling the adjustment mode for the first earphone device based on the detected re-engaged condition; and operating the second earphone device in the adjustment mode based on the adjustment mode for the first earphone device being cancelled.

The method may further comprise detecting a condition corresponding to the earphone device becoming completely disengaged from the user's ear; prior to operating said earphone device in an adjustment mode, causing output of an alert sound by an audio transducer of said earphone device; receiving an input corresponding to the user locating the earphone device; and operating the earphone device in the adjustment mode responsive to the received input.

The method may further comprise determining that the earphone device is beyond a predetermined distance from the user's ear and, responsive thereto, causing output of an alert sound to another, second earphone device having a paired relationship with said earphone device.

According to a third aspect, this specification describes a computer program comprising instructions for causing an apparatus to perform at least the following: detecting a condition corresponding to an earphone device becoming disengaged from a user's ear; and operating said earphone device in an adjustment mode based on detecting the condition, wherein, in the adjustment mode, an operation associated with a touch sensor on said earphone device is changed.

Example embodiments of the third aspect may also provide any feature of the second aspect.

According to a fourth aspect, this specification describes a computer-readable medium (such as a non-transitory computer-readable medium) comprising program instructions stored thereon for performing at least the following: detecting a condition corresponding to an earphone device becoming disengaged from a user's ear; and operating said earphone device in an adjustment mode based on detecting the condition, wherein, in the adjustment mode, an operation associated with a touch sensor on said earphone device is changed.

According to a fifth aspect, this specification describes an apparatus comprising: at least one processor; and at least one memory including computer program code which, when executed by the at least one processor, causes the apparatus to: detecting a condition corresponding to an earphone device becoming disengaged from a user's ear; and operating said earphone device in an adjustment mode based on detecting the condition, wherein, in the adjustment mode, an operation associated with a touch sensor on said earphone device is changed.

BRIEF DESCRIPTION OF DRAWINGS

Example embodiments will now be described, by way of non-limiting example, with reference to the accompanying drawings, in which:

FIGS. 5A-5B are schematic views of a user wearing first and second earphone devices, useful for understanding operation of some example embodiments when one of the earphone devices becomes completely disengaged;

DETAILED DESCRIPTION

Figure 1:
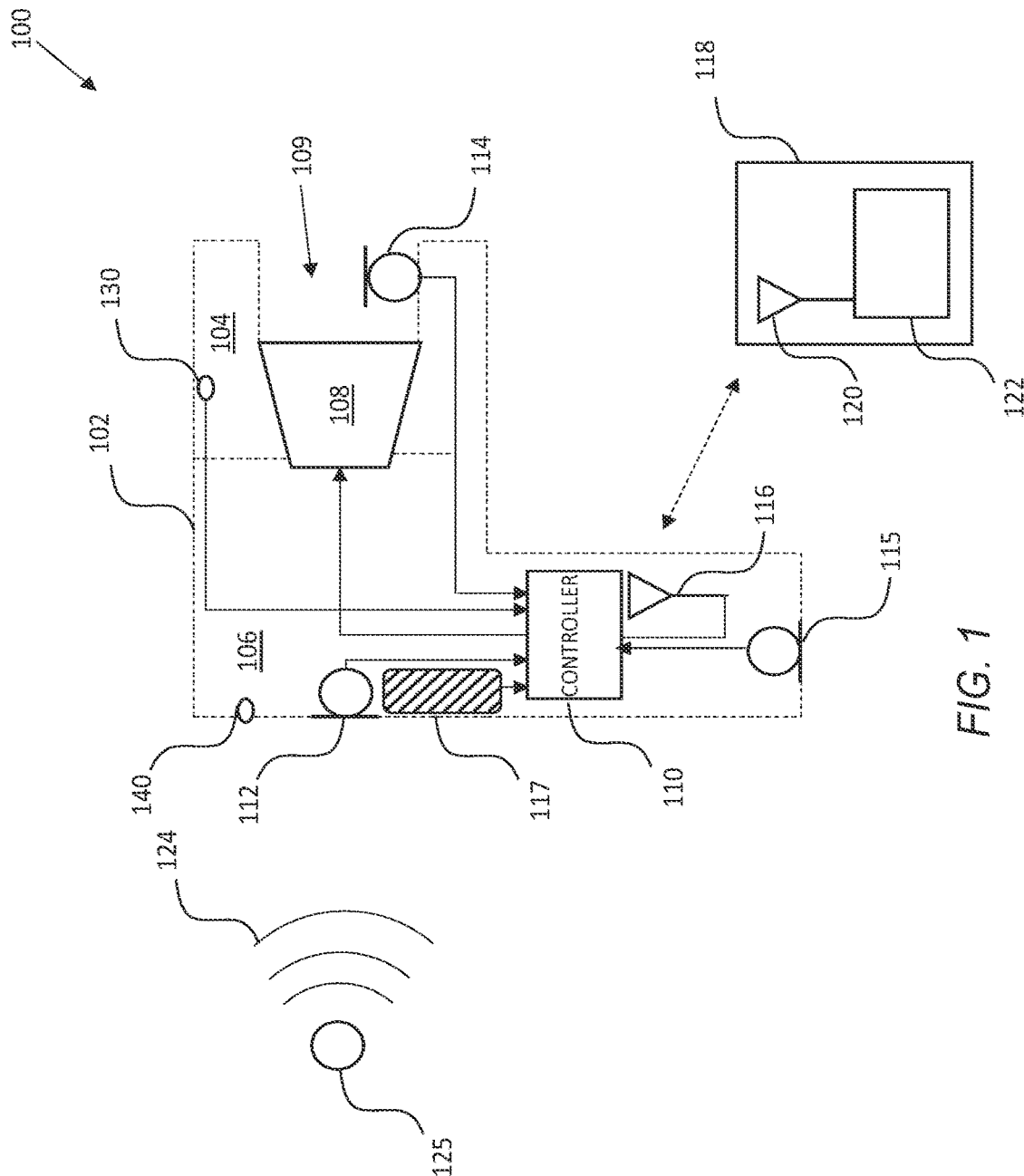
FIG. 1 is a schematic view of an example system comprising an earphone device and a user device according to some example embodiments.

Example embodiments may relate to an apparatus, method and computer program for control of an earphone device which may be used as a generic term to describe an earphone or earbud.

As will be appreciated, an earphone may be configured to locate over or adjacent a user's ear whereas an earbud may locate at least partially within a user's ear canal in use. All such examples are covered by the term earphone device.

A pair or set of such earphone devices may be provided, each earphone device being for placement over or within a respective ear of the user, i.e. left and right ears, which may be used to output stereoscopic (left and right channel) or even spatial audio to the user.

An earphone device may be configured to be carried or worn by a user and capable of producing sound waves from one or more output transducers thereof. The one or more output transducers may be loudspeakers for converting electrical signals or data into audible sound waves. An earphone device may also comprise input functionality, such as one or more input transducers, e.g. microphones, for converting sound waves to electrical signals.

Other input functionality may comprise one or more touch sensors located on a body of one or both earphone devices. Example operations that may be performed responsive to receipt of user inputs via touch sensors include, in the context of audio playback, playing audio, pausing audio, advancing to a subsequent track, reverting to a previous track, increasing/decreasing volume, and power on/off functions. Other operations may be performed in other use contexts, such as when the user is engaged in a telephone call, conference call or videoconference. For example, selection of a touch sensor during a telephone call may end the call.

An earphone device may communicate signals or data with a user device, e.g. mobile handset, either wirelessly or through a wired connection. Wireless communications may be by means of any suitable wireless protocol such as Bluetooth, Zigbee or WiFi, e.g. using the IEEE 802.11 communications standard. In some cases, an earphone device may send audio data to a user device, for example if the earphone device comprises an input transducer such as a microphone. For example, part of a voice call may be received by a microphone of the earphone device and relayed to the user device, such as a smartphone. As another example, a voice command or query may be received by the microphone of the earphone device and relayed to the user device which may provide digital assistant functionality.

Input received via the above-mentioned one or more touch sensors may also be communicated with the user device which may, via software, determine which operations are to be performed responsive to the received inputs, which may be based on a currently-active application on the user device.

A user device may comprise any processing device capable of providing at least audio data to the earphone device, for example, but not limited to, a smartphone, digital assistant, digital music player, personal computer, laptop, tablet computer or a wearable device such as a smartwatch. The user device may also comprise one or more decoders for decoding the audio data into a format appropriate for output by the loudspeakers of the earphone device. The user device may also comprise one or more memory modules for storing audio data, although in some embodiments, the user device may be configured to receive streaming audio data from a remote source, e.g. via the cloud, and hence may only temporarily store the audio data. The user device may be capable of establishing a communication session with a third party via a network, e.g. an audio or videoconference or a voice call. The user device may be configured to transmit and receive data using protocols for 3G, 4G, LTE, 5G or any future generation communication protocol. The user device may comprise means for short-range communications using, for example, Bluetooth, Zigbee or WiFi. The user device may comprise a display screen and one or more control buttons. The display screen may be touch-sensitive. The user device may comprise one or more antennas for communicating with external devices, including the earphone device.

An earphone device may also comprise passive and/or active noise reduction (ANR) features or functions for blocking at least some ambient sounds from reaching the ears of a user. As will be appreciated, ambient sounds from noise-producing sources which are external to the earphone device can be distracting. ANR features may include an ANR system, which is an electrical or electronic system associated with one or more microphones and one or more loudspeakers. The ANR system performs signal processing, for example by processing ambient sounds received by the one or more microphones in such a way as to generate a cancellation signal for output by the one or more loudspeakers. The cancellation signal, by means of destructive interference, acts to reduce or cancel the user's perception of the ambient sounds when it is output. For example, the ANR system may generate a cancellation signal which is in antiphase with received ambient sounds.

In an apparatus comprising first and second earphone devices, each earphone device may comprise one or more microphones, an ANR system and a loudspeaker. For each earphone device, a microphone of that earphone may receive ambient sound waves which are then converted to ambient sound signals and processed by the ANR system to generate the cancellation signal which is output by the loudspeaker of that earphone device. Each earphone device may therefore have independent ANR functionality.

Example embodiments may provide an apparatus, method and computer-program for detecting a condition corresponding to an earphone device becoming disengaged from a user's ear. The term "disengaged" is intended to cover situations whereby the earphone device is becoming loose or displaced from its "in-use" position, for example when it is about to fall, or has fallen from the user's ear.

For example, where the earphone device is an earbud, its in-use position may comprise at least part of the earphone device being within the user's ear canal with a relatively snug fit. A disengaged condition may occur accidentally, for example due to motion of the user when wearing one or more earphone devices. For example, a user walking or running when listening to music or part of a call may experience one or more of the worn earphone devices becoming disengaged. This may result in a loss of perceived audio quality and/or functionality of an ANR system, if provided.

Example embodiments may also involve operating the earphones device in an adjustment mode based on detecting the disengaged condition, wherein, in the adjustment mode, an operation associated with a touch sensor on said earphone device may be changed.

In this context, a natural reaction of a user when sensing that a worn earphone device is becoming disengaged is to move their hand towards the device in order to re-engage the earphones device. By changing an operation associated with the touch sensor, a reactionary contact by the user on the touch sensor may prevent performing an unintended function, e.g. switching the earphone device off or ending the call. For example, in the adjustment mode, the apparatus may be configured to disable operation of the touch sensor. This may involve causing the earphone device not to transmit a signal to the user device responsive to a touch input, or may involve causing a user device in communication with the earphone device not to respond to receipt of a signal from the earphone device resulting from a touch input.

Other operations may result from entering an adjustment mode, as will be explained later on. Operations, including those above, may be temporary, and the adjustment mode may be cancelled upon, for example, detection that the earphone device is re-engaged with the user's ear.

In some embodiments, the adjustment mode may be entered upon additionally (i.e. after detecting the disengaged condition) determining the presence of an object such as the user's hand in proximity to the earphone device.

Other operations in the adjustment mode may comprise, for example, reducing a volume of, or disabling output of, an audio signal being output from said earphone device. Further, where the earphone device is part of a set, e.g. having a paired relationship with another, second earphone device, part or all of the audio signal that is disabled may be moved to the second earphone device, e.g. for the duration of the adjustment mode.

In some embodiments, if there is a close similarity between the audio signal being output from the earphone device and an audio signal being output from the second earphone device, the apparatus may not move part or all of first audio signal to the second earphone device. This may be based on determining a similarity between the first audio signal and the second audio signal, and moving output of the first audio signal to the second earphone only if the similarity is below a predetermined threshold value.

Other operations in the adjustment mode may comprise disabling operation of a microphone provided on said earphone device. Additionally, a microphone provided on another, second earphone device having a paired relationship with said earphone device may be enabled so that call functionality, for example, can carry on.

FIG. 1 shows an example system 100 comprising a first earphone device 102 and a user device 118.

The first earphone device 102 may be one of a pair of earphone devices. Only the first earphone device 102 is shown for ease of explanation. It will be appreciated that the other, second earphone device of the pair may comprise the same hardware and functionality and may differ only in that it receives data/signals from the user device 118 intended for that particular earphone device, e.g. its corresponding audio channel.

The earphone device 102 may comprise a body comprised of an ear-insert portion 104 and an outer portion 106. The ear-insert portion 104 is arranged so as to partly enter a user's ear canal in use, whereas the outer portion 106 remains substantially external to the user's ear in use. An output transducer such as a loudspeaker 108 may be positioned within the ear-insert portion 104 and is directed such that sound waves are emitted in use through an aperture 109 defined within the ear-insert portion 104, towards a user's ear. The aperture 109 may or may not be closed-off by a mesh or grille (not shown).

The earphone device 102 may comprise a controller 110 within, for example, the outer portion 106. The controller 110 may comprise one or more circuits, processors, controllers, application specific integrated circuits (ASICs) or field-programmable gate arrays (FPGA).

The controller 110 may operate under control of computer-readable instructions or code, which, when executed by the one or more circuits, processors, controllers, ASICs or FPGAs, may perform operations described herein.

The controller 110 may be configured also to provide an active noise reduction (ANR) system, e.g. to provide conventional ANR functionality, although a separate ANR module may be provided for that purpose.

The first earphone device 102 may comprise a first microphone 112 mounted on or in the outer portion 106. One or more other "external" microphones may be mounted on or in the outer portion 106. The first microphone 112 is connected to the controller 110 so as to provide, in use, a feedforward signal representative of ambient sounds 124 from one or more ambient sources 125 picked-up by the first microphone 112. The feedforward signal may be used as part of the ANR system. The first earphone device 102 may also comprise a second microphone 114 mounted on or in the aperture 109 of the ear-insert portion 104. One or more other "interior" microphones may be mounted on or in the aperture 109 of the ear-insert portion 104. The second microphone 114 is connected to the controller 110 so as to provide, in use, a feedback signal representative of ambient sounds 124 when output from the loudspeaker 108. The feedback signal may also be used as part of the ANR system.

A third microphone 115 is also shown mounted on or in the outer portion 106. The third microphone 115 may be configured for picking-up voice/speech signals from a user as a form of input. In some example embodiments, the first microphone 112 may provide the functionality of the third microphone 115, which would therefore not be required.

The first earphone device 102 may also comprise a touch sensor 117 mounted on or in the outer portion 106. The touch sensor 117 may be of any suitable type, e.g. a capacitive touch sensor, whereby responsive to user contact, a sensing signal may be generated and received by the controller 110. The controller 110 may respond to the received sensing signal by one or more of controlling an aspect of the first earphone device 102, e.g. switching it off, and controlling an aspect of the user device 118 or a user device application, e.g. pausing playback or ending a call. More than one touch sensor 117 may be provided on the first earphone device 102.

The first earphone device 102 may also comprise an antenna 116 for communicating signals with an antenna 120 of the user device 118. The antenna 116 is shown connected to the controller 110 which may be assumed to comprise transceiver functionality, e.g. for Bluetooth, Zigbee or WiFi communications. In some embodiments, separate transceiver functionality, e.g. a communications circuit, may be associated with the controller 110.

The user device 118 may also comprise one or more circuits, processors, controllers, application specific integrated circuits (ASICs) or FPGAs, generally indicated by reference numeral 122, for providing user device functionality such as that of a smartphone, digital assistant, digital music player, personal computer, laptop, tablet computer or wearable device such as a smartwatch.

Figure 2:
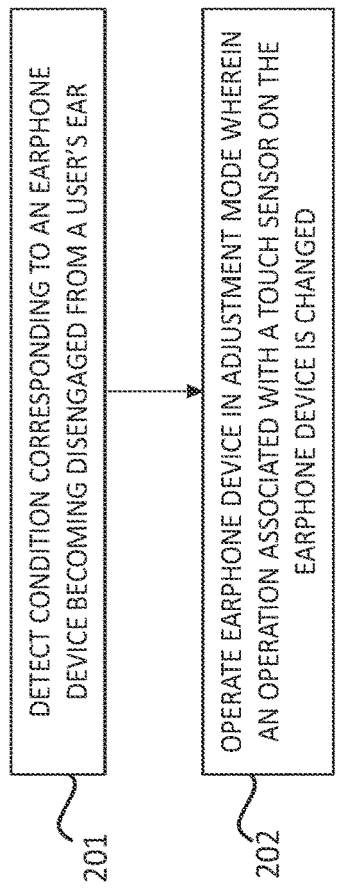
FIG. 2 is a flow diagram indicating processing operations according to some example embodiments.

Referring to FIG. 2 a flow diagram is shown indicating processing operations that may be performed by the controller 110 according to one or more example embodiments. The processing operations may be performed by hardware, software, firmware or a combination thereof. In some embodiments, the processing operations may be performed by a controller 122 of the user device 118 in signal communication with, for example, the first earphone device 102 shown in FIG. 1.

A first operation 201 may comprise detecting a condition corresponding to an earphone device becoming disengaged from a user's ear.

A second operation 202 may comprise operating the earphone device in an adjustment mode based on detecting the condition, wherein, in the adjustment mode, an operation associated with a touch sensor on said earphone device is changed.

In order to detect the above-mentioned condition corresponding to an earphone device becoming disengaged, there are various methods.

For example, referring back to FIG. 1, there may be provided a photo detector 130 mounted at or in the ear-insert portion 104 of the earphone device 102. The photo detector 130 may be located externally on the ear-insert portion 104 and electrically connected to the controller 110 such that, when properly engaged with a user's ear, the photo sensor is covered and hence little or no light will be received by the photo detector 130 and hence little or no signal sent to the controller 110. As the earphone device 102 becomes disengaged, i.e. loose, some ambient light will be received by the photo detector 130 and hence some signal sent to the controller 110. If above a threshold, the controller 110 may trigger the adjustment mode. In some embodiments, more than one photo detector 130 may be provided on the ear-insert portion 104 at respective positions along its main axis for a higher resolution indication of disengagement.

Additionally, or alternatively, detection of the earphone device 102 becoming disengaged may be based on audio processing. For example, the controller 110 may be configured to measure, based on audio processing, a distance between a reference part of the ear-insert portion 104 and the user's ear drum, and monitor this distance to identify a particular distance that is indicative of a disengaged condition, or of a distance that is increasing from a default distance. For example, the controller 110 may monitor a time delay between transmitting one or more audio signals from the loudspeaker 108 and receiving the one or more corresponding audio signals that have bounced-back or echoed from the eardrum, e.g. through an internally-mounted microphone in the aperture 109 that may, for example, be positioned adjacent or behind the loudspeaker 108. The time delay may be processed by the controller 110 to estimate a distance continuously and/or periodically.

Additionally, or alternatively, detection of the earphone device 102 becoming disengaged may be based on the above time delay principles, but using ultrasounds or light signals instead of audio signals. For example, a light emitter may emit a beam or pulse of light towards the eardrum of the user and monitor the time delay between transmitting the beam or pulse of light and detecting its corresponding return or echo, e.g. via one or more photodetectors placed within the aperture 109 of the ear-insert portion 104. The time delay may be processed by the controller 110 to estimate a distance continuously or periodically.

Additionally, or alternatively, detection of the earphone device 102 becoming disengaged may be based on signal processing techniques indicative of the quality of seal between the ear-insert portion 104 of the earphone device 102 and the user's ear canal. For example, the controller 110 may be configured to determine the impedance of the loudspeaker using current measurements and/or acoustic measurements. Values of loudspeaker impedance for given frequency ranges which indicate a good quality of seal can be derived and stored, and thereafter the loudspeaker impedance may be monitored via current measurements and/or acoustic measurements to identify a poor seal or disengaged condition.

Additionally, or alternatively, detection of the earphone device 102 becoming disengaged may be based on operation of the ANR system mentioned above. For example, if the feedback signals being received from the second microphone 114 change such that they correlate beyond a predetermined threshold with the feedforward signals being received from the first microphone 112, this may indicate a disengaged condition because the signals are similar.

For example, if the ANR system determines that the amount of noise reduction it needs to apply, based on the difference between the feedback and feedforward signals, is above a predetermined threshold, this may also indicate a disengaged condition.

In example embodiments, in the adjustment mode, the controller 110 may disable operation of the touch sensor 117 thereby preventing any accidental contact by the user when attempting to adjust the first earphone device 102. This avoids causing an unintended operation, e.g. ending a call.

Figure 3:
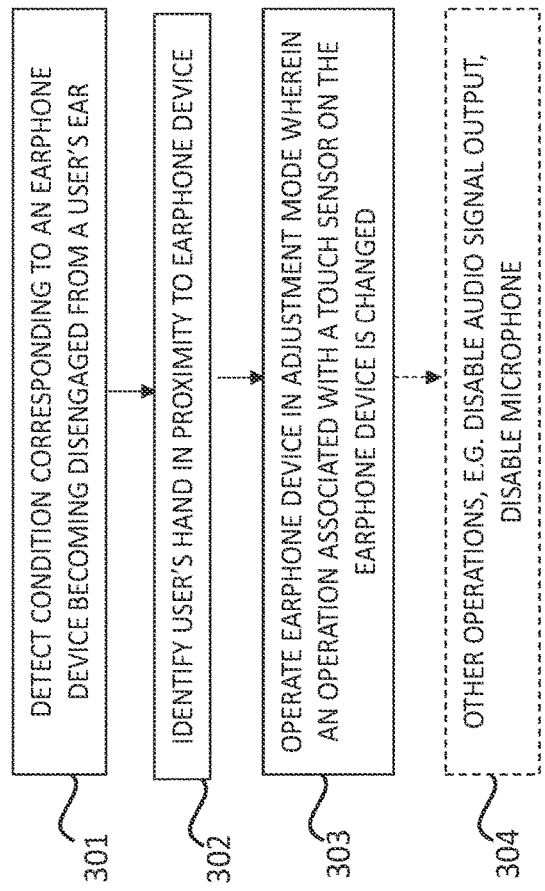
FIG. 3 is a flow diagram indicating processing operations according to other example embodiments.

Referring to FIG. 3 another flow diagram is shown indicating processing operations that may be performed by the controller 110 according to one or more example embodiments. The processing operations may be performed by hardware, software, firmware or a combination thereof. In some embodiments, the processing operations may be performed by a controller 122 of the user device 118 in signal communication with, for example, the earphone device 102 shown in FIG. 1.

A first operation 301 may comprise detecting a condition corresponding to an earphone device becoming disengaged from a user's ear.

A second operation 302 may comprise identifying a user's hand in proximity to the earphone device.

A third operation 303 may comprise operating said earphone device in an adjustment mode based on detecting the condition and user's hand in proximity, wherein, in the adjustment mode, an operation associated with a touch sensor on said earphone device is changed.

An optional fourth operation 304 may comprise performing one or more other operations such as will be described below.

Regarding the second operation 302, the earphone device 102 shown in FIG. 1 may comprise a proximity sensor 140 on the outer portion 106 of the earphone device 102, which may be one or more of an optical sensor, an acoustic sensor or similar. For example, using techniques similar to those described above with regard to measuring distance to the user's ear drum, a distance between part of the outer portion 106 and a user's hand may be measured and, if the distance is below a predetermined level, the user's hand may be considered proximate. As another example, the controller 110 may monitor the signal received by the first microphone 112 and, based on detecting a relatively sudden change in picked-up audio by the first microphone, e.g. above a predetermined level in a predetermined period of time, may determine that the user's hand is proximate. References to the user's hand may refer to a part of the user's hand, e.g. a finger.

In this example, therefore, the adjustment mode is not entered until both the disengagement condition is identified and the user's hand is proximate.

In another example embodiment, in response to the first operation 301, a prompt might be output to a user interface of, for example, the user device 118. The prompt may comprise an indication that the earphone device 102 is becoming disengaged and may ask the user if the adjustment mode is to be entered. This may involve displaying "yes" and "no" selectable user interface elements, whereafter the user's selection is effective to enter the adjustment mode if the "yes" user interface element is selected. Alternatively, or additionally, the prompt may be an audio prompt to the earphone device 102 that is becoming disengaged. A response to the prompt may be made in the above manner via a user interface and/or via voice commands picked-up via the third microphone 115 of the earphone device 102.

Example other operations that may be performed in the fourth operation 304 may now be summarized.

For example, in the adjustment mode, the controller 110 may reduce a volume of, or disable output of, an audio signal being output from the earphone device 102.

For example, if the earphone device 102 is a first earphone device which has a paired relationship with another, second earphone device, the output to the first earphone device may be disabled and the corresponding audio signal moved to the second earphone device.

Figure 4A:
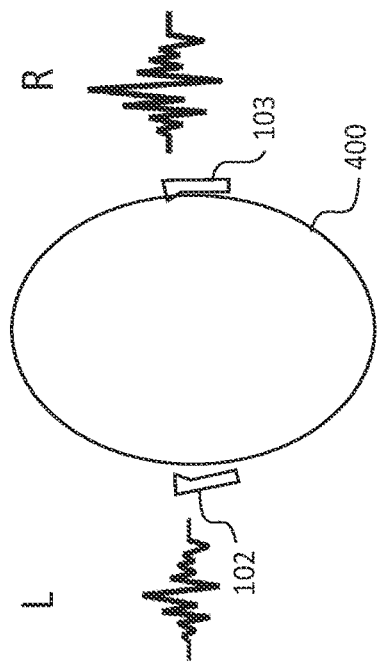
FIGS. 4A-4C are schematic views of a user wearing first and second earphone devices, useful for understanding operation of some example embodiments when one of the earphone devices becomes disengaged.
Figure 4B:
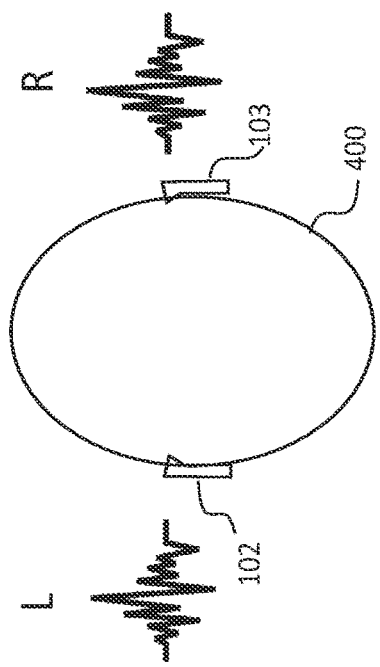
Figure 4C:
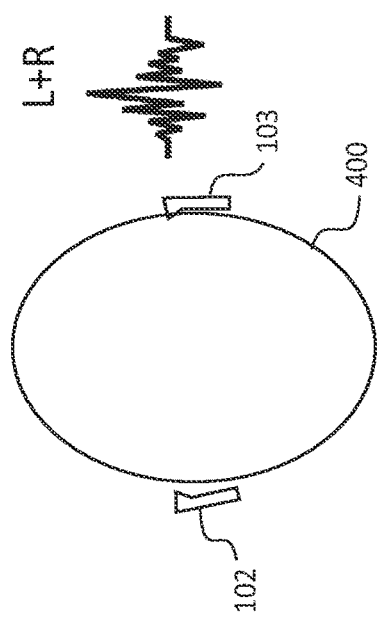

With reference to FIGS. 4A-4C, the above example is explained graphically. FIG. 4A shows a user 400 wearing the above first earphone device 102 and a second earphone device 103 which has a paired relationship with the first earphone device. Each of the first and second earphone devices 102, 103 output audio signals, e.g. stereoscopic audio signals, the first earphone device being associated with a left (L) channel and the second earphone device being associated with a right (R) channel. FIG. 4B indicates a situation where the first earphone device 102 becomes disengaged, as detected using any of the above one or more methods. In consequence, based on operations described above, e.g. with reference to FIG. 2 or FIG. 3, an adjustment mode is entered. With reference then to FIG. 4C, the left (L) channel audio signal is moved to the second earphone device 103. It will be appreciated that, in another situation, the second earphone device 103 might become disengaged, in which case the right (R) channel audio signal would be moved to the first earphone device 102.

In some example embodiments, the controller 110 may be configured to determine a similarity (e.g. a numerical measure of correlation) between a first audio signal, e.g. the left (L) channel audio signal being output from the first earphone device 102 and a second audio signal, e.g. the right (R) channel audio signal being output from the second earphone device 103, and to move output of the first audio signal to the second earphone only if the similarity is below a predetermined threshold value. This may ensure that audio content from the first earphone device 102 will not be missed if different from that from the second earphone device 103.

For example, in the adjustment mode, the controller 110 may also be configured to disable operation of a microphone provided on said earphone device, e.g. the third microphone 115. The controller 110 may also be configured to enable operation of another microphone e.g. an equivalent third microphone provided on the second earphone device 103. This may ensure that the user may still retain voice functionality, e.g. carry-on speaking in a call.

In the above example embodiments, the adjustment mode may be entered only temporarily. The controller 110 may be configured to detect a subsequent condition corresponding to, in the above case, the first earphone device 102 becoming re-engaged with the user's ear. The controller 110 may be configured to cancel the adjustment mode based on the detected re-engaged condition. The re-engaged condition may be detected based on, for example, the fact that the user's hand is determined no-longer to be in contact or proximate the first earphone device 102 based on one or more of the above-mentioned signal processing methods.

Alternatively, or additionally, the above-mentioned other methods for determining the disengagement condition may be employed in the reverse sense to detect re-engagement, e.g. based on the photo detector 130 no longer receiving light and therefore transmitting no signal to the controller 110.

When cancelling the adjustment mode, the above-mentioned operations may be cancelled. For example, the touch sensor 117 may be enabled. For example, audio signals that were disabled and/or moved from the first earphone device 102 to the second earphone device 103 may be resumed and/or moved back to the first earphone device 102. For example, the third microphone 115, if disabled, can be re-enabled.

In some example embodiments, an audio notification may be output to one or both of the first and second earphone devices 102, 103 to indicate the detected disengagement condition. This audio notification may simply comprise a tone which is output to the disengaged, e.g. first earphone device 102. The audio notification may comprise a voice message indicating the disengaged condition and/or actual mention of which earphone device is disengaged. Upon re-engagement, another audio notification, which may be a different tone or voice message, may indicate the detected re-engagement. This may be directed to the re-engaged earphone device, e.g. the first earphone device 102 on the basis that the second earphone device 103 may be playing other audio and hence the user may not hear the other audio notification.

In some cases, a further touch or voice input may be required, following said re-engagement notification in order to cancel the above-mentioned operations.

In some example embodiments, both the first and second earphone devices 102, 103 may become disengaged at substantially the same time.

In such a case, the following operations may be performed. The operations may be performed by a controller 110 of each of the first and second earphone devices 102, 103 operating in tandem, or by one controller operating on behalf of both the first and second earphone devices, or by a controller of the user device 118.

A first operation may comprise detecting a condition corresponding to a first earphone and a second earphone device having a paired relationship with the first earphone device becoming disengaged from a user's ear at a same time.

A second operation may comprise, based on detecting the condition, (i) operating the first earphone device in the adjustment mode, (ii) detecting a subsequent condition corresponding to the first earphone device becoming re-engaged with the user's ear, (iii) cancelling the adjustment mode for the first earphone device based on the detected re-engaged condition, and (iv) operating the second earphone device in the adjustment mode based on the adjustment mode for the first earphone device being cancelled. Thus, only one earphone device may enter the adjustment mode at a given time to maintain some form of ongoing functionality.

In some example embodiments, one of the first and second earphone devices 102, 103 may become completely disengaged and fall from the user's ear without the user necessarily noticing. This may occur if there is no audio being played at the time of disengagement. For example, the first earphone device 102 may fall into a user's jacket hood or may even fall onto the ground, e.g. if they are walking or running.

The falling of, for example, the first earphone device 102 completely out of the user's ear may be detected using one or more of the above examples, for example based on the audio signals received by the first and second microphones 112, 114 being similar or correlated above a predetermined threshold. Alternatively, or additionally, the detection may be based on one or more motion sensors (e.g. accelerometers, gyroscopes) which may indicate to the controller 110 a sensed motion which is indicative of a sudden drop in height and/or impact with a surface. Alternatively, or additionally, the detection may be based on other methods of positioning or ranging, for example with respect to the position of the user device 118.

In such a case, the controller 110 may operate as follows depending on how far the first earphone device 102 is estimated to be from the user.

For example, with reference to FIG. 5A, if it is determined that the first earphone device 102 has just fallen out of the user's ear, or is within a first range of the user device 118, the controller 110 may be configured, prior to operating the first earphone device in the adjustment mode, to cause output of an alert sound 501 by an audio transducer, e.g. the loudspeaker 108, of the earphone device. The alert sound 501 may be output at a high volume relative to the sound 502 from the second earphone device 103 to enable the user to locate the first earphone device 102. The controller 110 may then receive an input corresponding to the user locating the earphone device, e.g. via the touch sensor 117. The controller 110 may then operate the first earphone device 102 in the adjustment mode based on the above examples responsive to the received input.

For example, with reference to FIG. 5B, if it determined that the first earphone device 102 is outside the first predetermined distance or range of the user device 118, the alert sound 501, or a different alert sound, may be output by an audio transducer (e.g. loudspeaker) of the second earphone device 103. The second earphone device 103 is assumed to be still in the user's ear and hence may inform them as to the situation. Upon locating the first earphone device 102, the same operations referred to above may be performed, e.g. receiving an input, e.g. via the touch sensor 117 and operating in the adjustment mode responsive to the received input.

The first earphone device 102 being outside the first distance or range may result from a loss of communications via a short-range link, e.g. a Bluetooth link between the first earphone device and the user device 118. Alternatively, other methods for determining if the first earphone device 102 is outside of the first distance or range may be based on other positioning methods, such as by using a positioning marker or sensor on the first earphone device.

Example embodiments may therefore provide an intuitive way of enabling a user to adjust an earphone device if it is detected as becoming disengaged, e.g. loose. For example, touch sensors may be changed, e.g. disable, to prevent accidental operations when a user attempts to re-engage the earphone device, and also audio may be moved and/or microphone functionality enabled on another earphone device. Feedback may be received when the earphone device becomes re-engaged and previous functionality may return by means of the so-called adjustment mode being temporary.

Example Apparatus

Figure 6:
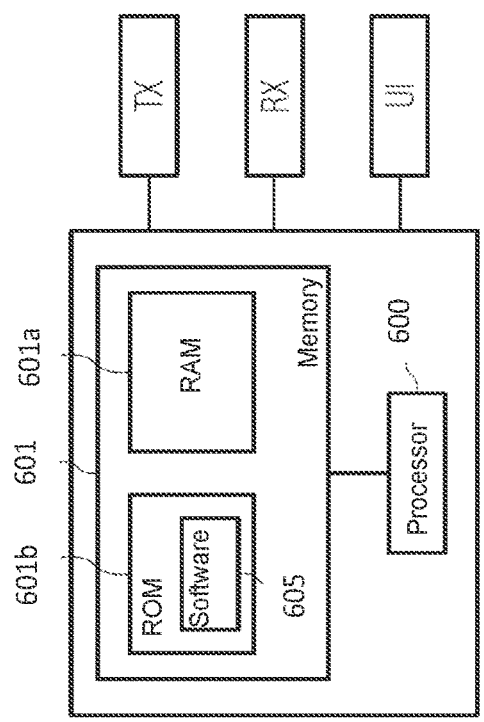
FIG. 6 shows an apparatus in accordance with an example embodiment.

FIG. 6 shows an apparatus according to some example embodiments, which may comprise the controller 110 if configured to perform the operations disclosed or, if a separate apparatus is provided for performance of the operations disclosed, the FIG. 6 apparatus may comprise that separate apparatus. The apparatus may be configured to perform the operations described herein, for example operations described with reference to any disclosed process. The apparatus comprises at least one processor 600 and at least one memory 601 directly or closely connected to the processor. The memory 601 includes at least one random access memory (RAM) 601a and at least one read-only memory (ROM) 601b. Computer program code (software) 605 is stored in the ROM 601b. The apparatus may be connected to a transmitter (TX) and a receiver (RX). The apparatus may, optionally, be connected with a user interface (UI) for instructing the apparatus and/or for outputting data. The at least one processor 600, with the at least one memory 601 and the computer program code 605 are arranged to cause the apparatus to at least perform at least the method according to any preceding process, for example as disclosed in relation to the flow diagrams of FIGS. 2 and/or 3 and related features thereof.

Figure 7:
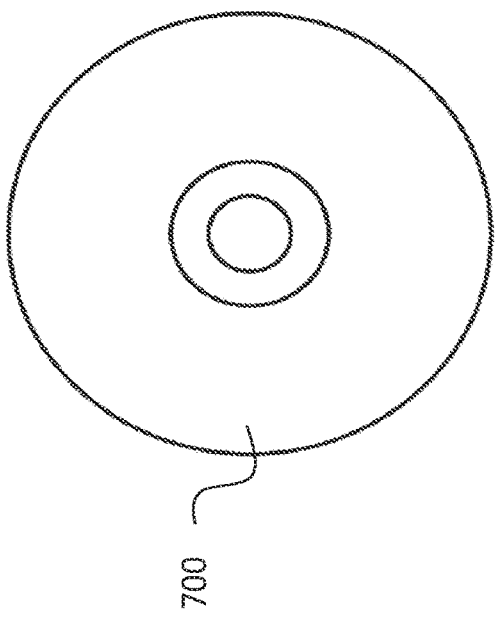
FIG. 7 shows a non-transitory media in accordance with an example embodiment.

FIG. 7 shows a non-transitory media 700 according to some embodiments. The non-transitory media 700 is a computer readable storage medium. It may be e.g. a CD, a DVD, a USB stick, a blue ray disk, etc. The non-transitory media 700 stores computer program code, causing an apparatus to perform the method of any preceding process for example as disclosed in relation to the flow diagrams of FIGS. 2 and/or 3 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
at least one processor; and
at least one memory including computer program code,
the at least one memory and the computer program code configured to, with the at least one processor, cause the apparatus to perform at least the following:
detect, based at least in part on a measure of a quality of seal between an earphone device and a user's ear, a condition corresponding to the earphone device becoming disengaged from the user's ear;
operate said earphone device in an adjustment mode based on the detection of the condition, wherein, in the adjustment mode, an operation associated with a touch sensor on said earphone device is changed; and detect a re-engaged condition corresponding to said earphone device becoming re-engaged with the user's ear.

2. The apparatus of claim 1, wherein, in the adjustment mode, the apparatus is configured to disable operation of the touch sensor.

3. The apparatus of claim 1, further configured to cause to determine a user's hand in proximity of said earphone device, and wherein the apparatus is configured to operate said earphone device in the adjustment mode based on the detection of the condition and the user's hand in proximity of said earphone device.

4. The apparatus of claim 3, wherein the apparatus is further configured to cancel the adjustment mode based on the re-engaged condition and the user's hand not being proximate to said earphone device.

5. The apparatus of claim 1, wherein, in the adjustment mode, the apparatus is further configured to reduce a volume of, or disable output of, an audio signal output from said earphone device.

6. The apparatus of claim 5, wherein, in the adjustment mode, the apparatus is further configured to disable the output of the audio signal and to move the output of the audio signal to a second earphone device having a paired relationship with said earphone device.

7. The apparatus of claim 6, wherein, in the adjustment mode, the apparatus is configured to determine a similarity between a first audio signal output from said earphone device and a second audio signal being output from the second earphone device, and to move the output of the first audio signal to the second earphone device only if the similarity is below a predetermined threshold value.

8. The apparatus of claim 1, wherein, in the adjustment mode, the apparatus is further configured to disable operation of a microphone provided on said earphone device.

9. The apparatus of claim 8, wherein the apparatus is further configured to enable operation of a microphone provided on a second earphone device having a paired relationship with said earphone device.

10. The apparatus of claim 1, further configured to cause to issue a notification via a user interface, the notification being associated with operating said earphone device in the adjustment mode.

11. The apparatus of claim 1, further configured to cause to:
detect the condition corresponding to the earphone device and a similar condition corresponding a second earphone device, becoming respectively disengaged from a user's ears substantially at a same time;
detect a subsequent condition corresponding to the first earphone device becoming re-engaged with the user's ear;
cancel the adjustment mode for the first earphone device based on the detected re-engaged condition; and
operate the second earphone device in the adjustment mode based on the adjustment mode for the first earphone device being cancelled;
wherein the earphone device is a first earphone device, and
wherein the second earphone device having a paired relationship with the first earphone device.

12. The apparatus of claim 1, further configured to cause to:
detect the condition corresponding to the earphone device becoming completely disengaged from the user's ear;
prior to operating said earphone device in an adjustment mode, causing output of an alert sound by an audio transducer of said earphone device;

receive a user input corresponding to a location of the earphone device; and
operate the earphone device in the adjustment mode responsive to the received user input.

13. The apparatus of claim 12, further configured to cause to determine that the earphone device is beyond a predetermined distance from the user's ear and, responsive thereto, the apparatus is configured to cause output of an alert sound to another, second earphone device having a paired relationship with said earphone device.

14. A method, comprising:
detecting, based at least in part on a measure of a quality of seal between an earphone device and a user's ear, a condition corresponding to the earphone device becoming disengaged from the user's ear;
operating said earphone device in an adjustment mode based on the detection of the condition, wherein, in the adjustment mode, an operation associated with a touch sensor on said earphone device is changed; and
detecting a re-engaged condition corresponding to said earphone device becoming re-engaged with the user's ear.

15. The method of claim 14, wherein, in the adjustment mode, the operation of the touch sensor is disabled.

16. The method of claim 14, further comprising determining a user's hand being in proximity of said earphone device, and wherein the earphone device is configured to operate in the adjustment mode based on the detection of the condition and the user's hand in proximity of said earphone device.

17. The method of claim 16, further comprising cancelling the adjustment bode based on the detected re-engaged condition, wherein canceling the adjustment mode comprises canceling the adjustment mode based on the re-engaged condition and the user's hand not being proximate to said earphone device.

18. The method of claim 14, wherein, in the adjustment mode, a volume of an audio signal output from said earphone device is reduced or disabled.

19. The method of claim 18, wherein, in the adjustment mode, the output of the audio signal is disabled and the output of the audio signal is moved to a second earphone device having a paired relationship with said earphone device.

20. The method of claim 19, wherein, in the adjustment mode, a similarity between a first audio signal being the output from said earphone device and a second audio signal being the output from the second earphone device is determined, and the first audio signal is moved to the second earphone device only if the similarity is below a predetermined threshold value.

21. An apparatus comprising:
at least one processor; and
at least one memory including computer program code,
the at least one memory and the computer program code configured to, with the at least one processor, cause the apparatus to perform at least the following:
detect a condition corresponding to an earphone device becoming disengaged from a user's ear;
determine a user's hand in proximity of said earphone device satisfies a distance threshold;
operate said earphone device in an adjustment mode based on the detection of the condition and the user's hand in proximity of said earphone device, wherein, in the adjustment mode, an operation associated with a touch sensor on said earphone device is changed;

detect a re-engaged condition corresponding to said earphone device becoming re-engaged with the user's ear; and cancel the adjustment mode based on the detected re-engaged condition.

* * * * *